March 22, 1960
R. PROVART
2,929,897
SENSING SWITCH
Filed Nov. 12, 1958
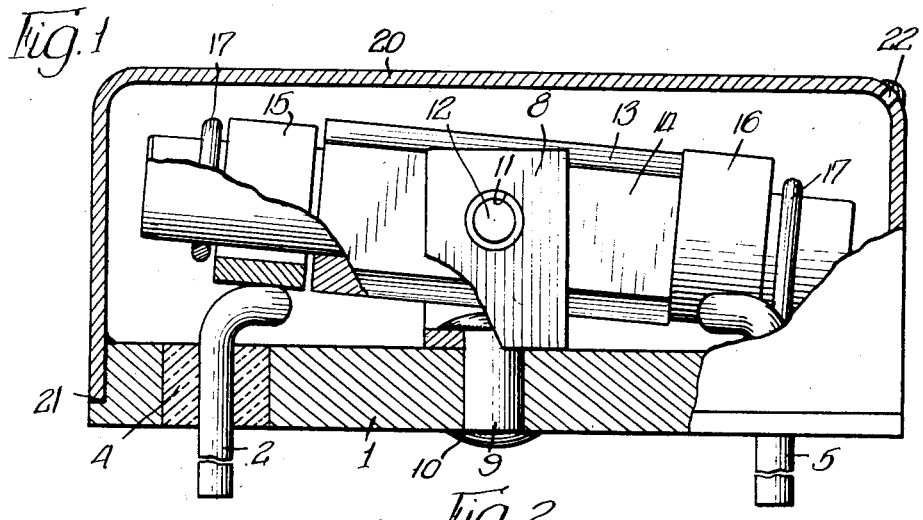
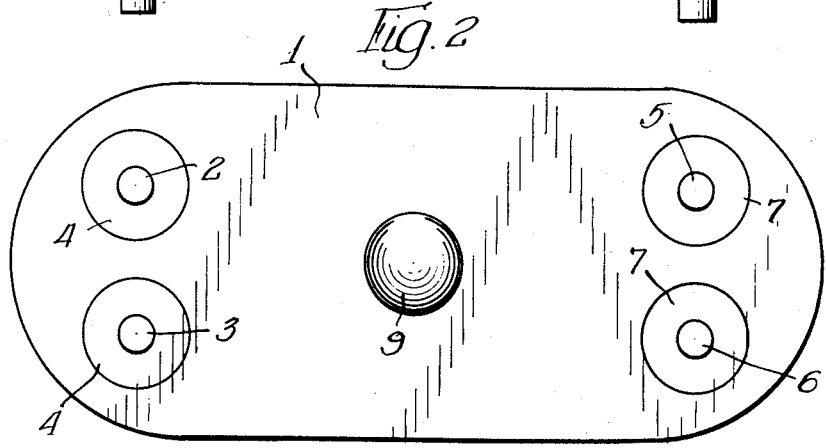
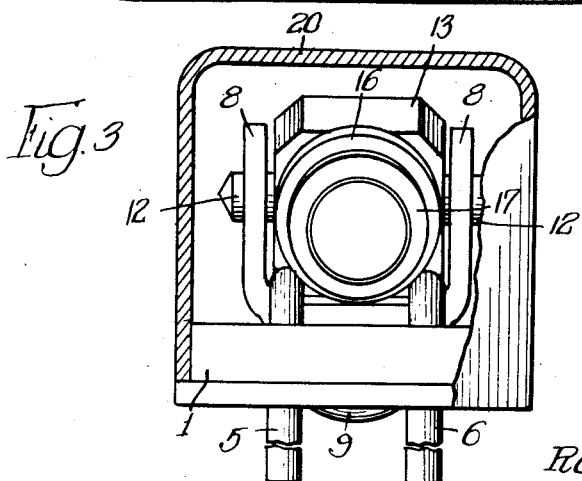
INVENTOR.
Robert Provart,
BY George H. Simmons
atty

United States Patent Office 2,929,897
Patented Mar. 22, 1960

2,929,897

SENSING SWITCH

Robert Provart, Palatine, Ill., assignor to Electrosnap Corporation, Chicago, Ill., a corporation of Illinois Application November 12, 1958, Serial No. 773,303

10 Claims. (Cl. 200—87)

This invention relates to magnetically operated sensing switches and has for its principal object the provision of a new and improved switch of this type.

It is a main object of the invention to provide a sensing switch operable by an external magnetic field to close one electrical circuit when the field is of one sign and to open that circuit and to close a second electrical circuit when the sign of the magnetic field changes.

Another object of the invention is to provide a sensing switch that is operable from one position to another by an external magnetic field, which switch, in the absence of an external magnetic field, is held in the position in which it was last set.

Another object of the invention is to provide a hermetically sealed sensing switch.

Another object of the invention is to provide a hermetically sealed sensing switch that is small in size and of light weight, but nevertheless is sufficiently rugged to function properly under hard usage.

Another object of the invention is to provide a hermetically sealed sensing switch that can be manufactured at lost cost without sacrificing quality.

Further objects not specifically mentioned here will be apparent from the detailed description and claims which follow, reference being had to the accompanying drawings in which a preferred embodiment of the invention is shown by way of example and in which:

Fig. 1 is an elevational view partly in section and showing the device;

Fig. 2 is a bottom side plan view of the device; and

Fig. 3 is an end elevational view partly in section.

Sensing switches movable from one position to another by an external magnetic field are frequently used in the electronic art. Thus, for example, the scanning screen of radar equipment may be provided with a magnet which rotates with the screen and between a series of sensing switches which are operated by the field of the magnet to change the switches from one position to another. It is to a sensing switch of this type that the present invention particularly refers.

In certain instances sensing switches must be very compact and of light weight to meet the requirements of the uses to which they are to be put. Also, to be satisfactory, such switches must be capable of operating over a wide range of atmospheric pressure and temperature, and must be unaffected by atmospheric changes. The device of the present invention meets these requirements.

The invention will be best understood by reference to the accompanying drawings wherein it will be seen that the switch of the present invention consists of a base 1 composed of a magnetic material, such as steel, which may be plated or otherwise coated to protect it from the elements.

Projecting through the base adjacent one end thereof are terminals 2 and 3, each of which is electrically insulated from the base by a glass seal 4 fused to the base and to the terminal. Also projecting through the base at the opposite end thereof are terminals 5 and 6, which are also insulated from the base by glass seals 7.

Fixed upon the base 1, midway between the groups of terminals, is a metallic stirrup 8 that is secured to the base in any preferred manner, such as by a rivet 9. Stirrup 8 is composed of a nonmagnetic metal such as brass. The head of the rivet 9 is sealed as by solder, as indicated at 10. The stirrup 8 contains perforations 11 through which pintles 12 on an insulating sleeve 13 are extended to pivotally mount the sleeve in the stirrup. The sleeve 13 and pintles 12 are composed of an insulating material which may be a thermosetting resin or a thermoplastic resin. Polyamide resin, commercially known as nylon, has been found to be satisfactory for this purpose.

Sleeve 13 encircles a permanent magnet 14 that extends to approximately the ends of the base 1.

Mounted upon the permanent magnet 14, at the opposite ends of the sleeve 13 are contact rings 15 and 16, which are preferably composed of low resistance material, such as silver. Rings 15 and 16 are loosely mounted upon the permanent magnet and are retained thereon by snap rings 17 that embrace the magnet between the contact rings and the end of the magnet.

In order to hermetically seal the switch mechanism a casing 20 is employed, this casing being composed of a nonmagnetic material such as, for example, nickel silver. A hermetic seal between the casing and base is formed in any preferred manner, such as by solder 21, and the space within the casing can be evacuated and filled with an inert gas through a seal hole 22 which is subsequently sealed to hermetically seal the switch mechanism.

When the switch mechanism is acted upon by a magnetic field of minimum strength of forty (40) gauss, the switch will be operated. Assuming that, as seen in Fig. 1, the right hand end of the magnet 14 is a south pole and assuming that the magnetic field acting on the switch is a south pole, the south pole of the magnet will be repelled and the north pole of the magnet attracted by the magnetic field, with the result that the magnet will turn on its pivot into the position shown in Fig. 1. In this position contact ring 16 bridges between contacts 5 and 6 to close an electrical circuit therebetween. Upon removal of the external magnetic field, the magnetic attraction between the south pole of the permanent magnet and the steel base 1 holds the switch in the position in which it was set by the external south magnetic field.

When the external magnetic field is a north pole, the north pole of the magnet will be repelled and the south pole thereof attracted, with the result that the switch will rotate counterclockwise, as seen in Fig. 1, to break the circuit between contacts 5 and 6, and as contact ring 15 moves into engagement with contacts 2 and 3, it will close a circuit therebetween. Upon removal of the north magnetic field, the attraction of the north magnet pole of the magnet 14 and the steel base 1 maintains the switch in which it was set by this north magnetic field.

The device of the present invention provides a sensing switch which is very small and of light weight. In one instance the overall length of the base 1 is but three-quarters (¾) of an inch, the width of the base five-sixteenths (5/16) of an inch, and the overall height also five-sixteenths (5/16) of an inch. Notwithstanding its compactness, the switch is thoroughly reliable in its operation, and since it is hermetically sealed is capable of functioning properly under widely varying atmospheric conditions. The switch can be manufactured at low cost and is capable of performing satisfactorily over a long period of time without attention.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. A sensing switch adapted to be operated by an external magnetic field comprising: a base; a permanent magnet pivotally mounted upon said base and having two poles both of which are acted upon equally by said external magnetic field; a contact ring encircling said magnet adjacent each of its ends, means for holding said rings upon said magnet; and two pairs of contacts fixed upon said base and insulated therefrom, the contacts of one pair being bridged by one contact ring when the magnet is tilted by an external magnetic field of one sign, and the contacts of the other pair being bridged by the other contact ring when the magnet is tilted by an external magnetic field of the opposite sign.

2. A sensing switch as specified in claim 1, in which the base is composed of a magnetic material, the contacts extend through the base and are hermetically sealed therein, and in which a nonmagnetic casing is sealed to the base and encloses the switch mechanisms to form a hermetic seal therefor.

3. A sensing switch as specified in claim 2, which is held in the position last set by attraction between the base and the pole of the magnet nearest thereto in the absence of an external magnetic field.

4. A sensing switch as specified in claim 2, in which the casing is composed of non-magnetic metal.

5. A sensing switch as specified in claim 1, in which the magnet is pivotally mounted by a metallic stirrup fixed upon the base and a non-metallic sleeve which encircles the magnet and is provided with pintles which project into perforations in the stirrup.

6. A sensing switch as specified in claim 5, in which the sleeve and pintles are composed of an insulating material which insulates the magnet from the base.

7. A sensing switch as specified in claim 6, in which the sleeve and pintles are composed of polyamide resin.

8. A sensing switch as specified in claim 1, in which the contact rings are loosely mounted upon the magnet and are composed of silver.

9. A sensing switch as specified in claim 1, in which the means for holding the contact rings on the magnet consist of steel rings snapped on the magnet between the contact rings and the ends of the magnet.

10. A sensing switch comprising: a base; two pairs of electrical contacts mounted upon said base, one pair adjacent each end thereof, each of said contacts being electrically insulated from the others; a stirrup mounted on said base at the approximate center thereof; a permanent magnet; an insulating sleeve encircling the central portion of said magnet; pintles on said sleeve registered with said stirrup to pivotally support the magnet upon said base; a pair of contact rings encircling said magnet and disposed one at each end of said sleeve, one of said contact rings bridging across one pair of contacts when the magnet is tilted in one direction and the other ring bridging across the other pair of contacts when the magnet is tilted in the other direction with respect to said base; and a retaining ring fixed between each contact ring and the adjacent end of the magnet to hold the contact ring on the magnet.

References Cited in the file of this patent

UNITED STATES PATENTS

| | | |
|---|---|---|
| 1,889,515 | Hammerly | Nov. 29, 1932 |
| 2,012,153 | Bates | Aug. 20, 1935 |
| 2,520,935 | Hubbell | Sept. 5, 1950 |
| 2,764,652 | Debuit | Sept. 25, 1956 |